(12) United States Patent (10) Patent No.: US 12,598,357 B2
Kim (45) Date of Patent: Apr. 7, 2026

(54) A/V TRANSMITTING DEVICE AND WIRELESS DISPLAY SYSTEM

(71) Applicant: LG ELECTRONICS INC., Seoul (KR)

(72) Inventor: Dong Sung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 78 days.

(21) Appl. No.: 18/404,650

(22) Filed: Jan. 4, 2024

(65) Prior Publication Data

US 2024/0422401 A1 Dec. 19, 2024

(30) Foreign Application Priority Data

Jun. 14, 2023 (KR) ........................ 10-2023-0076136

(51) Int. Cl.
| | |
|---|---|
| *H01Q 3/00* | (2006.01) |
| *G06F 3/0362* | (2013.01) |
| *G06F 9/451* | (2018.01) |
| *H04N 21/45* | (2011.01) |
| *H04N 21/485* | (2011.01) |

(52) U.S. Cl.
CPC ......... *H04N 21/485* (2013.01); *G06F 3/0362* (2013.01); *G06F 9/453* (2018.02); *H04N 21/4508* (2013.01); *H01Q 3/00* (2013.01)

(58) Field of Classification Search
CPC ................................... H01Q 1/12; H01Q 3/00
See application file for complete search history.

(56) References Cited

U.S. PATENT DOCUMENTS

| | | | |
|---|---|---|---|
| 2012/0182191 A1* | 7/2012 | King | H01Q 1/1257 |
| | | | 343/760 |
| 2023/0059959 A1 | 2/2023 | Lee et al. | |
| 2024/0088961 A1* | 3/2024 | Lee | H04N 21/44227 |

FOREIGN PATENT DOCUMENTS

| | | |
|---|---|---|
| JP | 2016-063386 | 4/2016 |
| WO | 2011-052168 | 3/2013 |
| WO | 2022-154194 | 7/2022 |
| WO | 2022-234874 | 11/2022 |

OTHER PUBLICATIONS

European Patent Office Application Serial No. 24150140.2 Search Report dated Sep. 9, 2024, 8 pages.
Japan Patent Office Application No. 2023-200398, Office Action dated Jan. 14, 2025, 7 pages.

* cited by examiner

*Primary Examiner* — Michael H Hong

(74) *Attorney, Agent, or Firm* — LEE, HONG, DEGERMAN, KANG & WAIMEY

(57) ABSTRACT

An A/V (Audio/video) transmitting device including a compression chip configured to compress an A/V data; an RF transmission interface configured to transmit the compressed A/V data to an A/V receiving device, where the RF transmission interface includes a plurality of transmission antennas; and a processor configured to: obtain an installation direction of the A/V transmitting device, obtain a wireless quality state between the A/V transmitting device and the A/V receiving device, generate a guide for adjusting the direction of the plurality of transmission antennas based on the installation direction of the A/V transmitting device and the wireless quality state, and transmit the generated guide to the A/V receiving device.

14 Claims, 18 Drawing Sheets

PCP

| CH | TX-ELE | RX-ELE | AWW | RSSI | Pre-SNR RX0 | Post-SNIR | T-put | MCS | PER-Min | PER-Max | PER-Avg | RX-Pkt | BPP | Beam ID | Beam Chg. Cnt |
|---|---|---|---|---|---|---|---|---|---|---|---|---|---|---|---|
| 1.2 | EL02 | EL02 | 42 | -17 | 27 | 21.5 | 9.3 | 19 | 0 | 0 | 0 | 52868 | 30 | ID00 | 0x00000000 |
| 1.2 | EL02 | EL02 | 42 | -17 | 27 | 21.5 | 8.8 | 19 | 0 | 0 | 0 | 64515 | 29 | ID00 | 0x00000000 |
| 1.2 | EL02 | EL02 | 42 | -17 | 27 | 21.5 | 9.2 | 19 | 0 | 0 | 0 | 77133 | 30 | ID00 | 0x00000000 |
| 1.2 | EL02 | EL02 | 42 | -17 | 27 | 21.5 | 9.4 | 19 | 0 | 0 | 0 | 89725 | 29 | ID00 | 0x00000000 |
| 1.2 | EL02 | EL02 | 42 | -17 | 27 | 21.5 | 9.2 | 19 | 0 | 0 | 0 | 102206 | 29 | ID00 | 0x00000000 |
| 1.2 | EL02 | EL02 | 42 | -17 | 27 | 21.5 | 9.2 | 19 | 0 | 0 | 0 | 114344 | 28 | ID00 | 0x00000000 |
| 1.2 | EL02 | EL02 | 42 | -17 | 27 | 21.5 | 9.2 | 19 | 0 | 0 | 0 | 126651 | 28 | ID00 | 0x00000000 |
| 1.2 | EL02 | EL02 | 42 | -17 | 27 | 21.5 | 8.4 | 19 | 0 | 0 | 0 | 138995 | 29 | ID00 | 0x00000000 |
| 1.2 | EL02 | EL02 | 42 | -17 | 27 | 21.5 | 8.4 | 19 | 0 | 0 | 0 | 154154 | 30 | ID00 | 0x00000000 |
| 1.2 | EL02 | EL02 | 42 | -17 | 27 | 21.5 | 8.3 | 19 | 0 | 0 | 0 | 166329 | 29 | ID00 | 0x00000000 |

NPCP

| ANT-TYPE | TX-PORT | | RX-ELE | AWV | RSSI RX0 | RSSI RX1 | Pre-SNR RX0 | Pre-SNR RX1 | Post-SNR | PER-Min | PER-Max | PER-Avg | RX-Pkt | Beam ID | Beam Chg. Cnt |
|---|---|---|---|---|---|---|---|---|---|---|---|---|---|---|---|
| DP_FRONT | EN2 | EL08 | EL08 | 17 | -43 | -21 | 14.5 | 26 | 24.5 | 0.0078 | 0.0176 | 0.012 | 2323269 | ID00 | 0x00000000 |
| DP_FRONT | EN2 | EL08 | EL08 | 17 | -43 | -20 | 14.5 | 26 | 24.5 | 0.0078 | 0.0176 | 0.0118 | 2851610 | ID00 | 0x00000000 |
| DP_FRONT | EN2 | EL08 | EL08 | 17 | -43 | -20 | 14.5 | 26 | 24.5 | 0.0077 | 0.0176 | 0.0119 | 3393235 | ID00 | 0x00000000 |
| DP_FRONT | EN2 | EL08 | EL08 | 17 | -43 | -20 | 14.5 | 26 | 24.5 | 0.0077 | 0.0176 | 0.0118 | 3943017 | ID00 | 0x00000000 |
| DP_FRONT | EN2 | EL08 | EL08 | 17 | -43 | -20 | 14.5 | 26 | 24.5 | 0.0077 | 0.0176 | 0.012 | 4490633 | ID00 | 0x00000000 |
| DP_FRONT | EN2 | EL08 | EL08 | 17 | -43 | -20 | 14.5 | 26 | 24.5 | 0.0077 | 0.0192 | 0.0123 | 5028552 | ID00 | 0x00000000 |
| DP_FRONT | EN2 | EL08 | EL08 | 17 | -43 | -20 | 14.5 | 26 | 24.5 | 0.0077 | 0.0192 | 0.0124 | 5569429 | ID00 | 0x00000000 |
| DP_FRONT | EN2 | EL08 | EL08 | 17 | -43 | -20 | 14.5 | 26 | 24.5 | 0.0077 | 0.0192 | 0.0124 | 6242147 | ID00 | 0x00000000 |
| DP_FRONT | EN2 | EL08 | EL08 | 17 | -43 | -20 | 14.5 | 26 | 24.5 | 0.0077 | 0.0192 | 0.0123 | 6779727 | ID00 | 0x00000000 |
| DP_FRONT | EN2 | EL08 | EL08 | 17 | -43 | -20 | 14.5 | 26 | 24.5 | 0.0077 | 0.0192 | 0.0122 | 7321222 | ID00 | 0x00000000 |

1131 — RX-ELE

1133 — AWV

FIG. 12A

| CH | TX-ELE | RX-ELE | AWV | RSSI | Pre-SNR RX0 | Post-SNR | T-put | MCS | PER-Min | PER-Max | PER-Avg | RX-Pkt | BPP | Beam ID | Beam Chg. Cnt |
|----|--------|--------|-----|------|-------------|----------|-------|-----|---------|---------|---------|--------|-----|---------|---------------|
| 12 | EL16 | EL16 | 42 | -25 | 15 | 14 | 4.4 | 13 | 0 | 0 | 0 | 52868 | 12 | ID00 | 0x00000000 |
| 12 | EL16 | EL16 | 42 | -25 | 15 | 14 | 4.4 | 13 | 0 | 0 | 0 | 64515 | 12 | ID00 | 0x00000000 |
| 12 | EL16 | EL16 | 42 | -25 | 15 | 14 | 4.4 | 13 | 0 | 0 | 0 | 77133 | 12 | ID00 | 0x00000000 |
| 12 | EL16 | EL16 | 42 | -25 | 15 | 14 | 4.4 | 13 | 0 | 0 | 0 | 89725 | 12 | ID00 | 0x00000000 |
| 12 | EL16 | EL16 | 42 | -25 | 15 | 14 | 4.4 | 13 | 0 | 0 | 0 | 102206 | 12 | ID00 | 0x00000000 |
| 12 | EL16 | EL16 | 42 | -25 | 15 | 14 | 4.4 | 13 | 0 | 0 | 0 | 114344 | 12 | ID00 | 0x00000000 |
| 12 | EL16 | EL16 | 42 | -25 | 15 | 14 | 4.4 | 13 | 0 | 0 | 0 | 126651 | 12 | ID00 | 0x00000000 |
| 12 | EL16 | EL16 | 42 | -25 | 15 | 14 | 4.4 | 13 | 0 | 0 | 0 | 138995 | 12 | ID00 | 0x00000000 |
| 12 | EL16 | EL16 | 42 | -25 | 15 | 14 | 4.4 | 13 | 0 | 0 | 0 | 154154 | 12 | ID00 | 0x00000000 |
| 12 | EL16 | EL16 | 42 | -25 | 15 | 14 | 4.4 | 13 | 0 | 0 | 0 | 166329 | 12 | ID00 | 0x00000000 |

1210

1211

1213

PCP

| ANT-TYPE | TX-PORT | | RX-ELE | AWV | RSSI RX0 | RSSI RX1 | Pre-SNR RX0 | Pre-SNR RX1 | Post-SNR | PER-Min | PER-Max | PER-Avg | RX-Pkt | Beam ID | Beam Chg. Cnt |
|---|---|---|---|---|---|---|---|---|---|---|---|---|---|---|---|
| DP_LEFT | EN2 | EL03 | EL03 | 54 | -43 | -28 | 14.5 | 26 | 14 | 0.0078 | 0.0176 | 0.012 | 2323269 | ID00 | 0x00000000 |
| DP_LEFT | EN2 | EL03 | EL03 | 54 | -43 | -28 | 14.5 | 26 | 14 | 0.0078 | 0.0176 | 0.0118 | 2851610 | ID00 | 0x00000000 |
| DP_LEFT | EN2 | EL03 | EL03 | 54 | -43 | -28 | 14.5 | 26 | 14 | 0.0077 | 0.0176 | 0.0119 | 3393235 | ID00 | 0x00000000 |
| DP_LEFT | EN2 | EL03 | EL03 | 54 | -43 | -28 | 14.5 | 26 | 14 | 0.0077 | 0.0176 | 0.0118 | 3943017 | ID00 | 0x00000000 |
| DP_LEFT | EN2 | EL03 | EL03 | 54 | -43 | -28 | 14.5 | 26 | 14 | 0.0077 | 0.0176 | 0.012 | 4490633 | ID00 | 0x00000000 |
| DP_LEFT | EN2 | EL03 | EL03 | 54 | -43 | -28 | 14.5 | 26 | 14 | 0.0077 | 0.0192 | 0.0123 | 5028552 | ID00 | 0x00000000 |
| DP_LEFT | EN2 | EL03 | EL03 | 54 | -43 | -28 | 14.5 | 26 | 14 | 0.0077 | 0.0192 | 0.0124 | 5569429 | ID00 | 0x00000000 |
| DP_LEFT | EN2 | EL03 | EL03 | 54 | -43 | -28 | 14.5 | 26 | 14 | 0.0077 | 0.0192 | 0.0124 | 6242147 | ID00 | 0x00000000 |
| DP_LEFT | EN2 | EL03 | EL03 | 54 | -43 | -28 | 14.5 | 26 | 14 | 0.0077 | 0.0192 | 0.0123 | 6779727 | ID00 | 0x00000000 |
| DP_LEFT | EN2 | EL03 | EL03 | 54 | -43 | -28 | 14.5 | 26 | 14 | 0.0077 | 0.0192 | 0.0122 | 7321222 | ID00 | 0x00000000 |

NPCP 1231    1233

A/V TRANSMITTING DEVICE AND WIRELESS DISPLAY SYSTEM

CROSS-REFERENCE TO RELATED APPLICATION

Pursuant to 35 U.S.C. § 119(a), this application claims the benefit of earlier filing date and right of priority to Korean Patent Application No. 10-2023-0076136, filed on Jun. 14, 2023, the contents of which are all hereby incorporated by reference herein in its entirety.

TECHNICAL FIELD

The present disclosure relates to a wireless display system for wirelessly transmitting and receiving A/V data.

BACKGROUND ART

A digital TV service using a wired or wireless communication network is becoming common. The digital TV service can provide various services that could not be provided in the existing analog broadcasting service.

For example, IPTV (Internet Protocol Television), a type of digital TV service, and smart TV service provide bi-directionality that allows users to actively select the type of program to watch and the viewing time. IPTV and smart TV services may provide various additional services, such as Internet search, home shopping, and online games, based on this interactive nature.

Recently, TV service is provided through a wireless system in which an A/V transmitting device transmits a compressed audio/video (A/V) signal to an A/V receiving device through a wireless connection, and the A/V receiving device restores and outputs the compressed A/V signal.

In the case of a wireless system, since radio frequency (RF) communication is performed between an A/V transmitting device and an A/V receiving device through antennas, a positional relationship between transmission antennas and reception antennas is important for radio quality.

In general, the A/V transmitting device is located in front of the A/V receiving device, but a signal is transmitted through side antennas due to placement and direction of the transmission antenna of the A/V transmitting device.

In this case, since the signal strength is weak, the signal strength can be improved by increasing the number of operational transmission antennas of the A/V transmitting device, but there is a problem in that power consumption increases.

In addition, in the conventional technology, a service center may be required to evaluate and improve a user installation environment, where a user log is extracted and analyzed according to a service center (SVC) guide response.

However, due to the nature of the existing methods, including visiting the user's house to check the installation environment improve the wireless setting condition or con-necting with the user and providing the user with instructions on how to improve the installation, inconvenience may occur due to the initial installation environment or box location change.

DISCLOSURE

Technical Problem

An object of the present disclosure is to provide a guide for setting an optimal wireless environment based on input-ting an installation direction of an A/V transmitting device.

An object of the present disclosure is to provide a guide for easily and conveniently providing a wireless installation environment using user log information according to the installation environment.

Technical Solution

An A/V (Audio/video) transmitting device according to an embodiment of the present disclosure may comprise: a compression chip configured to compress an A/V data; an RF transmission interface configured to transmit the com-pressed A/V data to an A/V receiving device, wherein the RF transmission interface includes a plurality of transmission antennas; and a processor configured to: obtain an installa-tion direction of the A/V transmitting device, obtains a wireless quality state between the A/V transmitting device and the A/V receiving device, generate a guide for adjusting the direction of the plurality of transmission antennas based on the installation direction of the A/V transmitting device and the wireless quality state, and transmit the generated guide to the A/V receiving device.

An A/V (Audio/video) transmitting device according to an embodiment of the present disclosure may include a radio frequency (RF) transmission interface comprising a plurality of transmission antennas and configured to transmit A/V data to an A/V receiving device; a processor; and at least one memory including computer program code, where the at least one memory and the computer program code are configured, with the processor, to cause the A/V transmitting device to at least: obtain an installation direction of the A/V transmitting device; obtain a wireless quality state between the A/V transmitting device and the A/V receiving device; generate a guide for adjusting a direction of the plurality of transmission antennas based on the installation direction of the A/V transmitting device and the wireless quality state; and transmit the generated guide to the A/V receiving device.

An A/V (Audio/Video) receiving device according to an embodiment of the present disclosure may comprise: a display; a RF reception interface configured to receive compressed A/V data from an A/V transmitting device, the RF reception RF interface including a plurality of reception antennas; a restoration chip configured to restore the com-pressed A/V data; and a microcomputer configured to: display a setting screen for setting an installation direction of the A/V transmitting device on the display, obtain informa-tion on the installation direction selected according to a direction selection input received through the setting screen obtain a wireless quality state between the A/V transmitting device and the A/V receiving device, and display a guide for adjusting a direction of a plurality of transmission antennas generated based on the installation direction of the A/V transmitting device and the wireless quality state.

An A/V (Audio/Video) receiving device according to an embodiment of the present disclosure may include: a dis-play; a radio frequency (RF) reception interface comprising a plurality of reception antennas and configured to receive A/V data from an A/V transmitting device; a microcom-puter; and at least one memory including computer program code, where the at least one memory and the computer program code are configured, with the microcomputer, to cause the A/V receiving device to at least: display via the display a setting screen for setting an installation direction of the A/V transmitting device; obtain information on a selected installation direction according to a direction selec-tion input received through the setting screen; obtain a wireless quality state between the A/V transmitting device and the A/V receiving device; and display via the display a guide for adjusting a direction of a plurality of transmission antennas of the A/V transmitting device, wherein the guide is generated based on the installation direction of the A/V transmitting device and the wireless quality state.

A wireless display system including an audio/video (A/V) transmitting device and an A/V receiving device including a display according to an embodiment of the present disclosure, wherein the A/V transmitting device is configured to: obtain an installation direction of the A/V transmitting device, obtain a wireless quality state between the A/V transmitting device and the A/V receiving device, and generate a guide for direction control of a plurality of transmission antennas included in the A/V transmitting device based on the installation direction of the A/V transmitting device and the wireless quality state, and transmit the generated guide to the A/V receiving device, wherein the A/V receiving device is configured to display the received guide.

Advantageous Effects

According to an embodiment of the present disclosure, a guide for an optimal wireless environment can be provided even to a user who is using the wireless display system for the first time through an input for selecting only the direction in which the A/V transmitting device is installed.

According to an embodiment of the present disclosure, an active installation environment may be induced using user log information according to an installation environment, and a guide may be provided in real time by interactively approaching the user. Accordingly, a user's wireless installation environment can be easily and simply provided.

In addition, even if the user moves the location of the A/V transmitting device or the wireless installation environment changes, the user can easily adjust the antenna because an optimization guide is provided through the network.

DESCRIPTION OF DRAWINGS

FIG. 11A is an example of transmission log information if the installation direction of the A/V transmitting device is selected as the front direction.

FIG. 11B is an example of reception log information if the front direction is selected as the installation direction of the A/V transmitting device.

FIG. 12A is another example of transmission log information if the installation direction of the A/V transmitting device is selected as the front direction.

FIG. 12B is another example of reception log information if the front direction is selected as the installation direction of the A/V transmitting device.

BEST MODE

An audio/video (hereinafter referred to as A/V) transmitting device according to an embodiment of the present disclosure is an intelligent device in which a computer support function is added to a broadcast reception function, for example, and an Internet function is added while being faithful to the broadcast reception function and a handwriting type input device, a touch screen, or a space remote controller, etc., can be equipped with a more user-friendly interface.

In addition, by being connected to the Internet and a computer by supporting a wired or wireless Internet function, it is possible to perform functions such as e-mail, web browsing, banking, or games. A standardized universal OS can be used for these various functions.

Accordingly, since various applications can be freely added or deleted in the A/V transmitting device described in this disclosure, for example, on a general-purpose OS kernel, various user-friendly functions can be performed.

Figure 1:
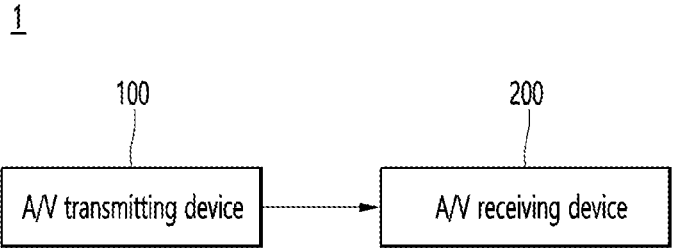
FIGS. 1 and 2 are diagrams for explaining the configuration of a display system according to an embodiment of the present disclosure.
Figure 2:
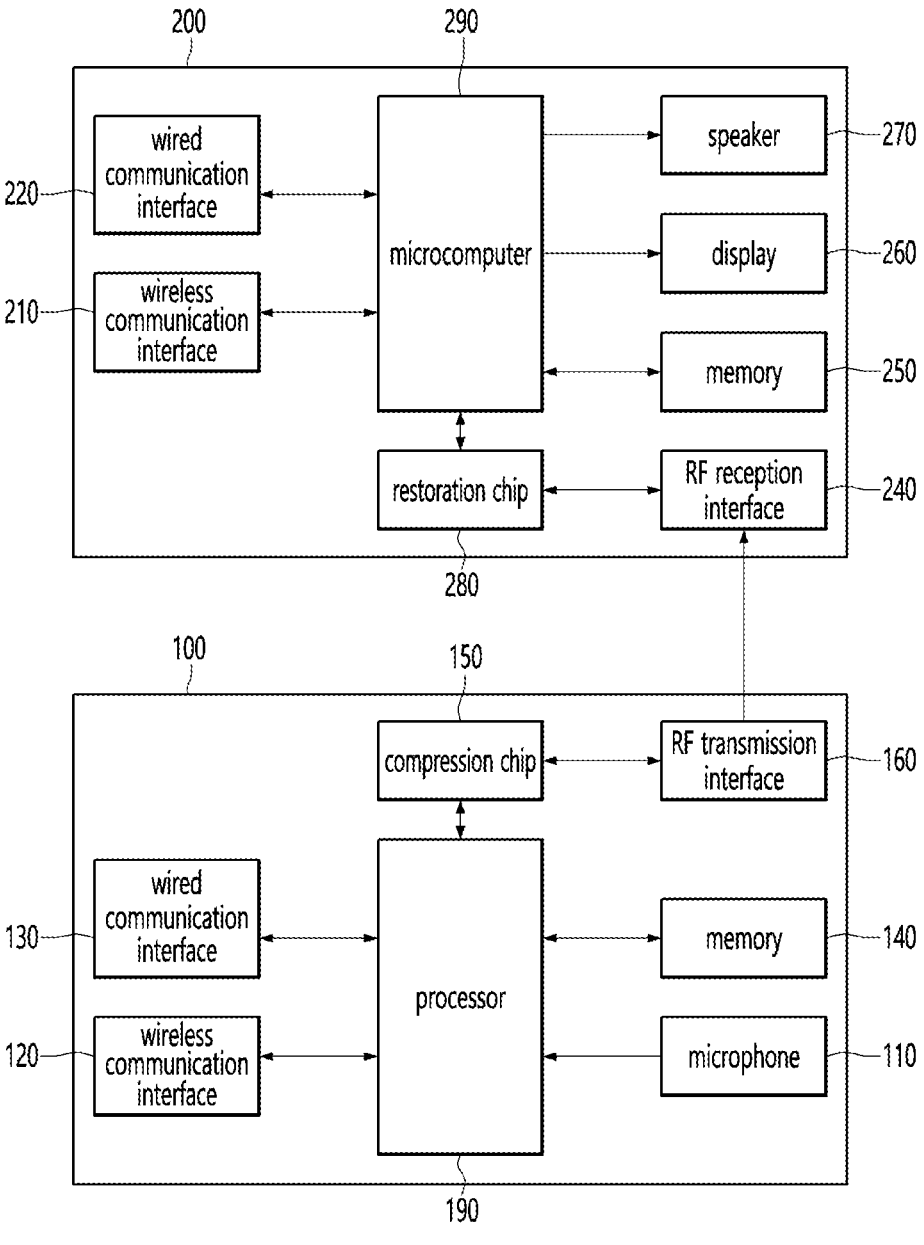

FIGS. 1 and 2 are diagrams for explaining the configuration of a wireless display system according to an embodiment of the present disclosure.

Referring to FIG. 1, a wireless display system 1 according to an embodiment of the present disclosure includes an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding video and audio and wirelessly transmitting the encoded content video and audio.

The A/V transmitting device 100 may be a set-top box.

The A/V transmitting device 100 may be connected to an external device such as a set-top box or a USB memory. The A/V transmitting device 100 may transmit a video signal or an audio signal received from a connected external device to the A/V receiving device 200.

The A/V receiving device 200 may be a display device capable of wirelessly receiving encoded video and audio and decoding the received video and audio.

The A/V transmitting device 100 and the A/V receiving device 200 may constitute a video wall display system.

In a video wall, having a display with a thin bezel plays an important role in visualizing video content. For minimizing the thin bezel of the display, it is important to include only necessary components in the display, and to include other circuitry or components for in a separate device.

The A/V transmitting device 100 may determine the type of video content received from the outside, and determine a compression rate of the video content based on the determined type. The compression rate of the video content may be defined as the ratio of the size of video data before encoding to the size of video data after encoding.

The type of video content may include a still video type, a general video type, a game video type, and the like.

The A/V transmitting device 100 may compress the video content according to the determined compression rate and wirelessly transmit the compressed video content to the A/V receiving device 200.

The A/V receiving device 200 may decode, or restore the compressed video content received from the A/V transmitting device 100 and display the decoded, or restored video content on a display.

FIG. 2 is a block diagram illustrating detailed configurations of the A/V transmitting device 100 and the A/V receiving device 200 according to an embodiment.

Referring to FIG. 2, the A/V transmitting device 100 may include a microphone 110, a wireless communication interface 120, a wired communication interface 130, a memory 140, a compression chip 150, and an RF transmission interface 160, and a processor 190.

The microphone 110 may receive an audio signal and transmit it to the processor 190. The microphone 110 may receive a voice uttered by a user.

The wireless communication interface 120 may include one or more of a Wi-Fi module and a Bluetooth module.

The Wi-Fi module may perform wireless communication with an external device or the A/V receiving device 200 through the Wi-Fi standard.

The Bluetooth module may perform wireless communication through a Bluetooth Low Energy (BLE) standard.

The Bluetooth module may perform wireless communication with an external device such as a remote controller or the A/V receiving device 200 through Bluetooth Low Energy (BLE) standards.

The wireless communication interface 120 may include a tuner that receives a broadcast signal.

The wired communication interface 130 may be an interface for wired connection with an external device. The wired communication interface 130 may include a plurality of High Definition Multimedia Interface (HDMI) terminals or Universal Serial Bus (USB) ports.

The wired communication interface 130 may receive a video signal or an audio signal from an external device.

The memory 140 may store a computer program for signal processing and control, and may store signal-processed video, audio, or data signals.

The memory 140 may perform a function for storing video, audio, or data signals input from the outside, and may store information about a predetermined image through a channel storage function.

The compression chip 150 may compress a video signal or an audio signal input from the outside and transmit the compressed signal to the RF transmission interface 160.

The compression chip 150 may include an encoder for compressing a video signal or an audio signal.

The RF transmission interface 160 may transmit the A/V signal to the RF reception interface 240 of the A/V receiving device 200 through radio frequency (RF) communication.

The RF transmission interface 160 may include one or more antennas.

The RF transmission interface 160 may transmit the compressed A/V signal in digital form to the RF reception interface 240.

The RF transmission interface 160 may transmit A/V signals to the RF reception interface 240 through one or more channels.

The processor 190 may control the overall operation of the A/V transmitting device 100. The processor 190 may be referred to as a Main System on Chip (Main SoC).

The processor 190 may also include a compression chip 150.

The A/V receiving device 200 may include a wireless communication interface 210, a wired communication interface 220, an RF reception interface 240, a memory 250, a display 260, a speaker 270, and a restoration chip 280 and a mi-com (microcomputer, for example implemented using one or more microchips) 290.

The wireless communication interface 210 may include a Wi-Fi module, a Bluetooth module, and an IR module.

The Wi-Fi module may perform wireless communication through the Wi-Fi standard.

The Wi-Fi module may perform wireless communication with an external device or the A/V transmitting device 100 through Wi-Fi standards.

The Bluetooth module may perform wireless communication through a Bluetooth Low Energy (BLE) standard.

The Bluetooth module may perform wireless communication with an external device such as a remote control or the A/V transmitting device 100 through Bluetooth Low Energy (BLE) standard.

The IR module may receive a signal from the remote controller 300 to be described later through IR (Infrared) communication.

The wired communication interface 220 may be an interface for wired connection with an external device. The wired communication interface 220 may include a plurality of High Definition Multimedia Interface (HDMI) terminals or Universal Serial Bus (USB) ports.

The wired communication interface 220 may receive a video signal or an audio signal from an external device.

The RF reception interface 240 may receive the compressed A/V signal from the RF transmission interface 160.

The RF reception interface 240 may include a plurality of antennas. The RF reception interface 240 may be disposed below the display 260.

The RF reception interface 240 may include a first antenna module and a second antenna module. Each of the first antenna module and the second antenna module may include a plurality of antennas.

The RF reception interface 240 may receive the digital compressed A/V signal from the RF transmission interface 160 and transfer the received A/V signal to the restoration chip 280.

The memory 250 may store a computer program for signal processing and control, and may store signal-processed video, audio, or data signal.

The display 260 may display an image signal received from the microcomputer 290.

The display 260 may display an image signal according to driving of a timing controller (not shown).

The restoration chip 280 may restore the compressed A/V signal received by the RF reception interface 240. To this end, the restoration chip 280 may include a decoder.

The microcomputer 290 may control overall operations of the A/V receiving device 200.

The microcomputer 290 may output the restored video signal through the display 260 and output the restored audio signal through the speaker 270.

Figure 3:
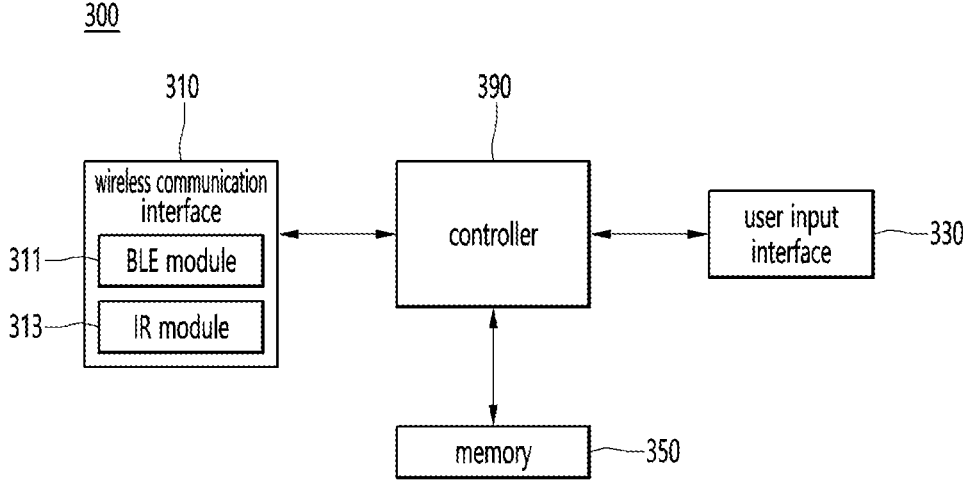
FIG. 3 is a block diagram illustrating the configuration of a remote control device according to an embodiment of the present disclosure.

FIG. 3 is a block diagram illustrating the configuration of a remote control device according to an embodiment of the present disclosure.

Referring to FIG. 3, the remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an InfraRed (IR) module 313.

The BLE module 311 may transmit a signal for controlling the operation of the A/V transmitting device 100 to the A/V transmitting device 100.

The BLE module 311 may transmit a signal triggering a pairing operation with the A/V transmitting device 100 to the A/V transmitting device 100.

The user input interface 330 may include a keypad, buttons, a touch pad, or a touch screen.

The user input interface 330 may generate a control command for controlling the operation of the A/V transmitting device 100 or the A/V receiving device 200 according to a user's manipulation command.

If the user input interface 330 includes a hard key button, the user can operate the hard key by pushing the hard key button.

The user input interface 330 may include various types of input means that the user can manipulate, such as a scroll key or a jog key.

The memory 350 may store computer programs for operating the controller 390 and may store input/output data.

The controller 390 controls operations related to application programs and generally the overall operation of the remote control device 300.

Figure 4A:
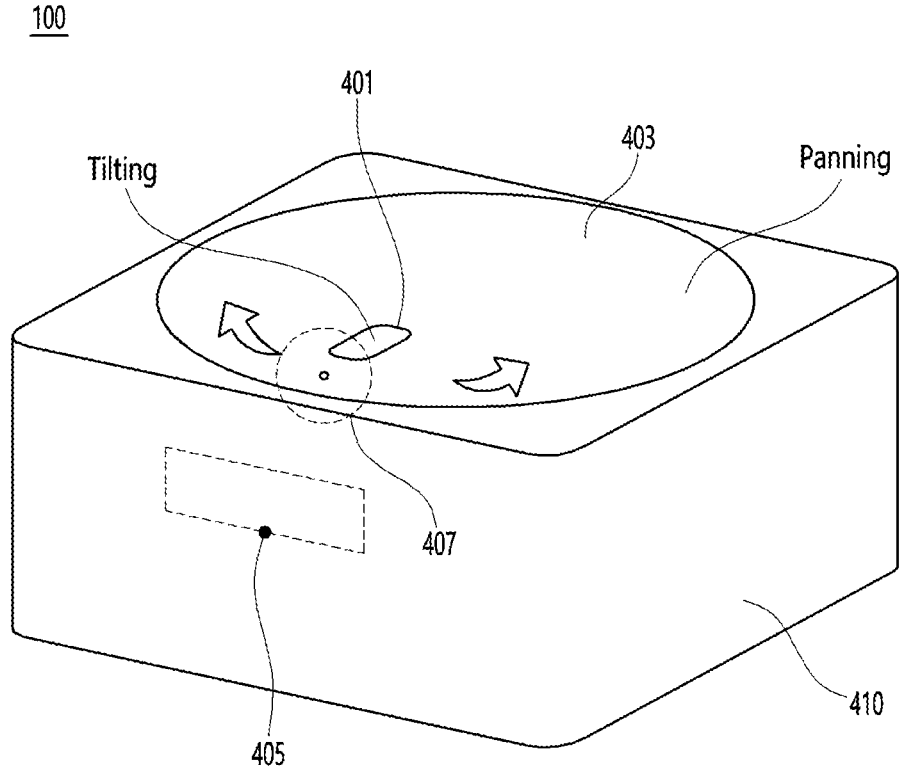
FIG. 4A is a perspective view of an A/V transmitting device.
Figure 4B:
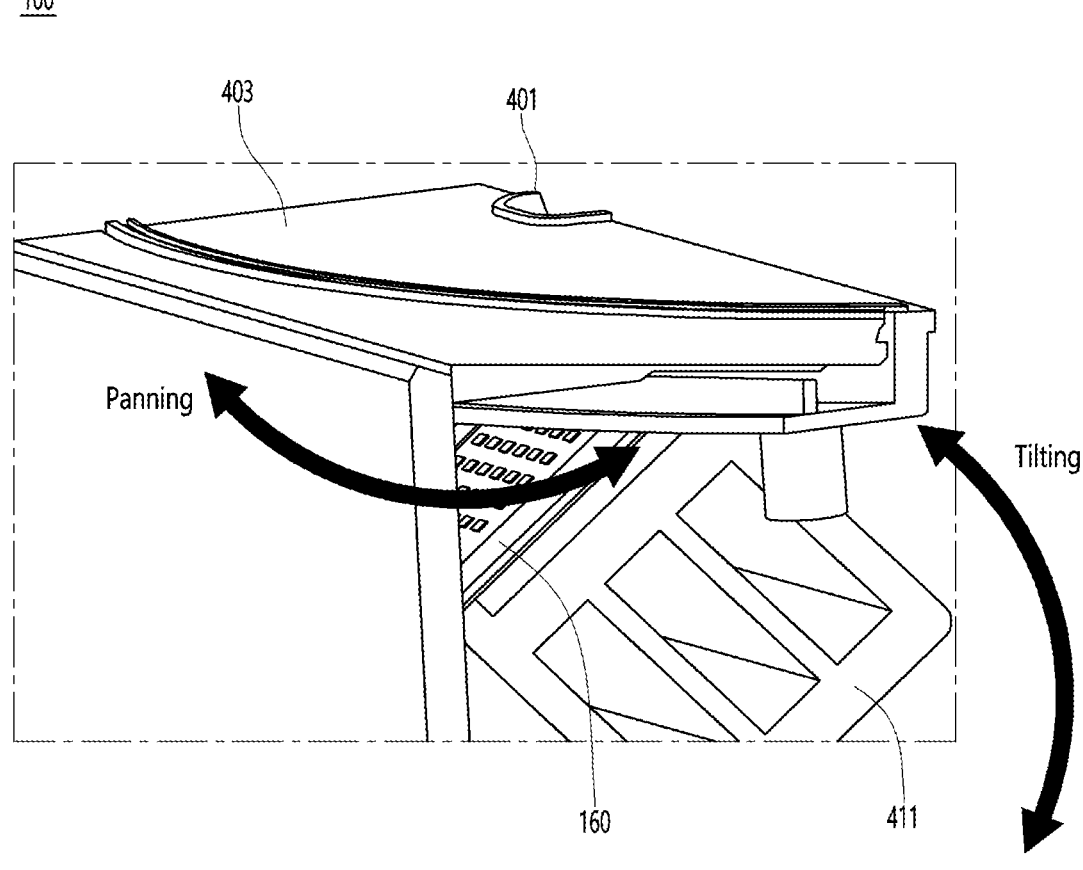
FIG. 4B is a diagram illustrating the internal structure of an A/V transmitting device.
Figure 4C:
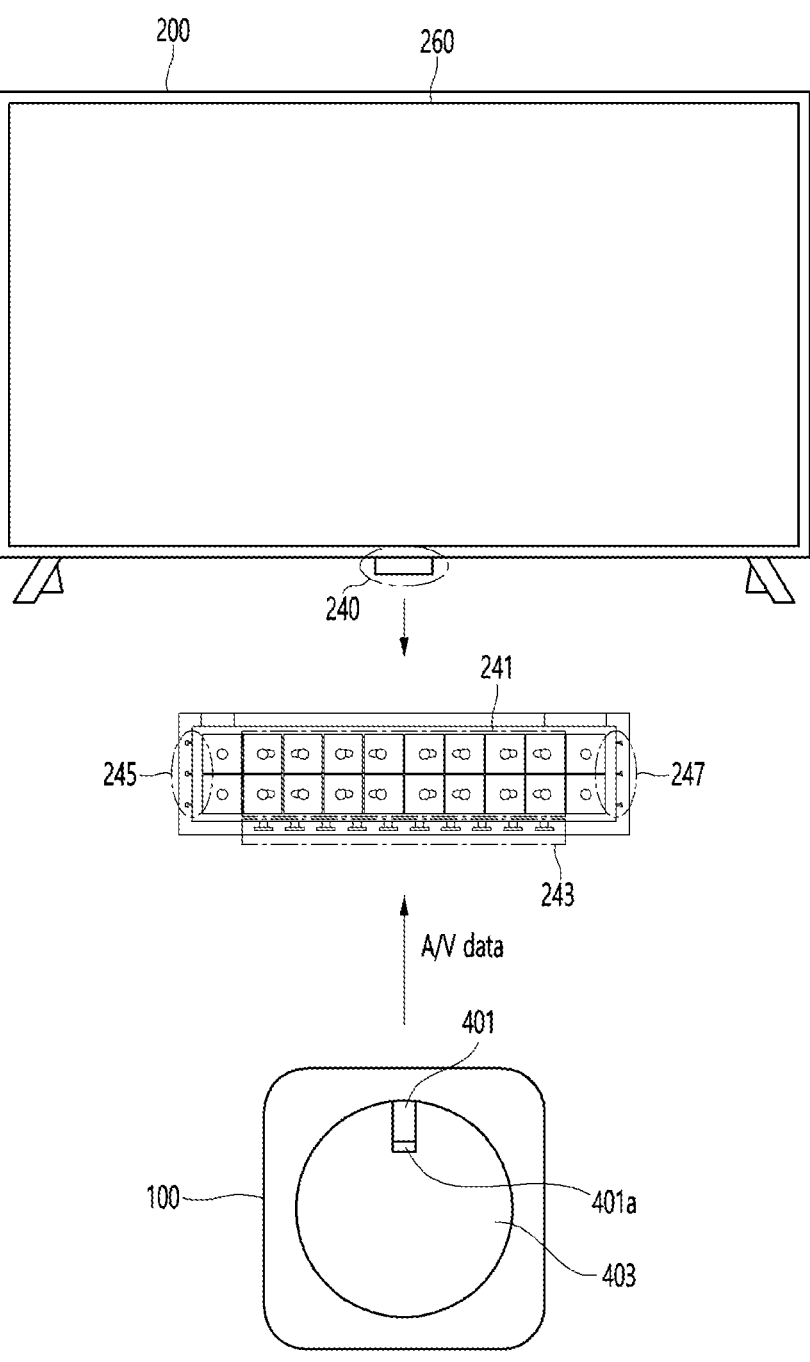
FIG. 4C is a diagram illustrating an RF reception interface of the A/V receiving device.

FIG. 4A is a perspective view of an A/V transmitting device according to an embodiment, FIG. 4B is a diagram illustrating an internal structure of the A/V transmitting device, and FIG. 4C is a diagram illustrating an RF reception interface of the A/V receiving device.

Referring to FIG. 4A, the A/V transmitting device 100 may include a box 410, a sliding button accommodating portion 401 accommodating a sliding button 401a, a dial 403, a power status display unit 405, and a communication quality status display unit 407.

Components of the A/V transmitting device 100 described in FIG. 2 may be included inside the box 410. The box 410 may be a housing including components of the A/V transmitting device 100 described in FIG. 2.

The sliding button 401a may be a means for controlling the vertical direction of the RF transmission interface 160 shown in FIG. 4B (tilting control).

The dial 403 may be a means for controlling the horizontal rotation direction (panning control) of the RF transmission interface 160 shown in FIG. 4B.

The power status display unit 405 may indicate the on or off state of the A/V transmitting device 100. The power status indicator 405 may include one or more LEDs.

The communication quality status display unit 407 may indicate a communication quality status between the A/V transmitting device 100 and the A/V receiving device 200. The communication quality status display unit 407 may include one or more LEDs.

The communication quality status display unit 407 may not be included in the box 410 as an optional configuration.

The processor 190 may receive a pointing correction input through the sliding button 401a or the dial 403.

The processor 190 may tilt the RF transmission interface 160 including the transmission antennas along a vertical direction according to an input for moving the sliding button 401a.

The RF transmission interface 160 may include a substrate and a plurality of transmission antennas. The RF transmission interface 160 may be provided on top of a heat sink 611 discharging heat generated inside the box 410.

The processor 190 may rotate or pan the RF transmission interface 160 including transmission antennas in a left and right direction according to an input for moving the dial 403.

The user may perform an antenna pointing correction operation by manipulating the sliding button 401a or the dial 403 while viewing the antenna guide used to adjust the direction of the transmission antenna.

According to another embodiment of the present disclosure, a motor (not shown) for automatically controlling tilting of the RF transmission interface 160 according to information on the determined vertical correction angle and a motor (not shown) for automatically controlling the panning of the RF transmission interface 160 may be further provided in the box 410 according to information on the determined horizontal correction angle.

In this case, even without a separate guide, the RF transmission interface 160 may be set to have an optimal arrangement structure, and user convenience may be maximized.

Referring to FIG. 4C, an RF reception interface 240 may be provided at the bottom of the display 260 of the A/V receiving device 200.

The RF reception interface 240 includes a plurality of reception antennas and receives A/V data from the A/V transmitting device 100.

The RF reception interface 240 may include a front antenna group 241 facing the front, a bottom face antenna group 243 facing the bottom face, a left face antenna group 245 facing the left face, and a right face antenna group facing the right face 247.

In an embodiment the number of antennas may be decreased in the order of the front antenna group 241, the bottom antenna group 243, the left antenna group 245, and the right antenna group 247.

Figure 5:
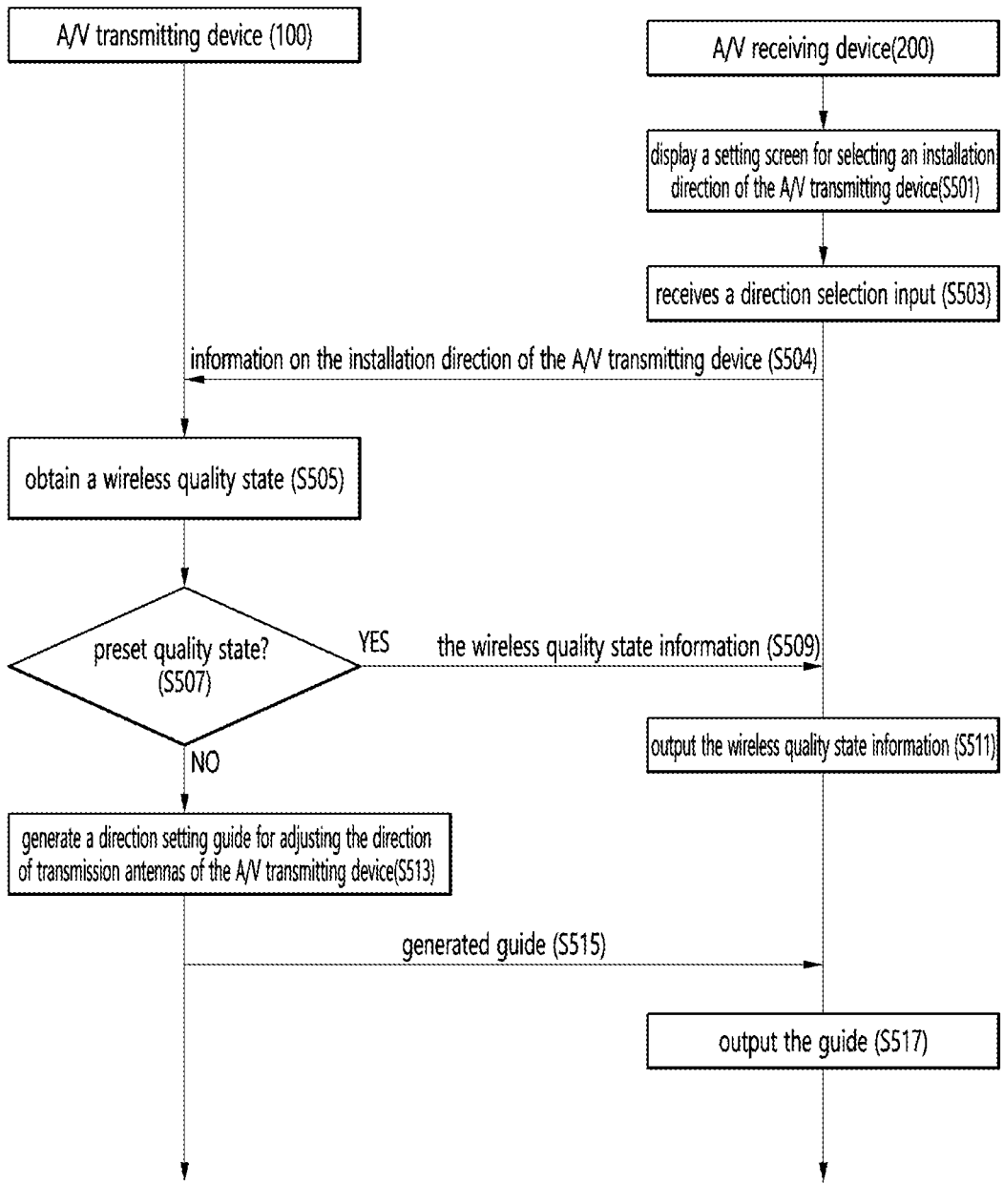
FIG. 5 is a ladder diagram for explaining a method of operating a wireless display system according to an embodiment of the present disclosure.

FIG. 5 is a ladder diagram for explaining a method of operating a wireless system according to an embodiment of the present disclosure.

The microcomputer 290 of the A/V receiving device 200 displays a setting screen for selecting an installation direction of the A/V transmitting device 100 on the display 260 (S501).

In one embodiment, the installation direction of the A/V transmitting device 100 may be a direction relative to the A/V receiving device 200.

The installation direction of the A/V transmitting device 100 may be any one of the bottom, side, and front of the display 260 of the A/V receiving device 200.

Figure 6:
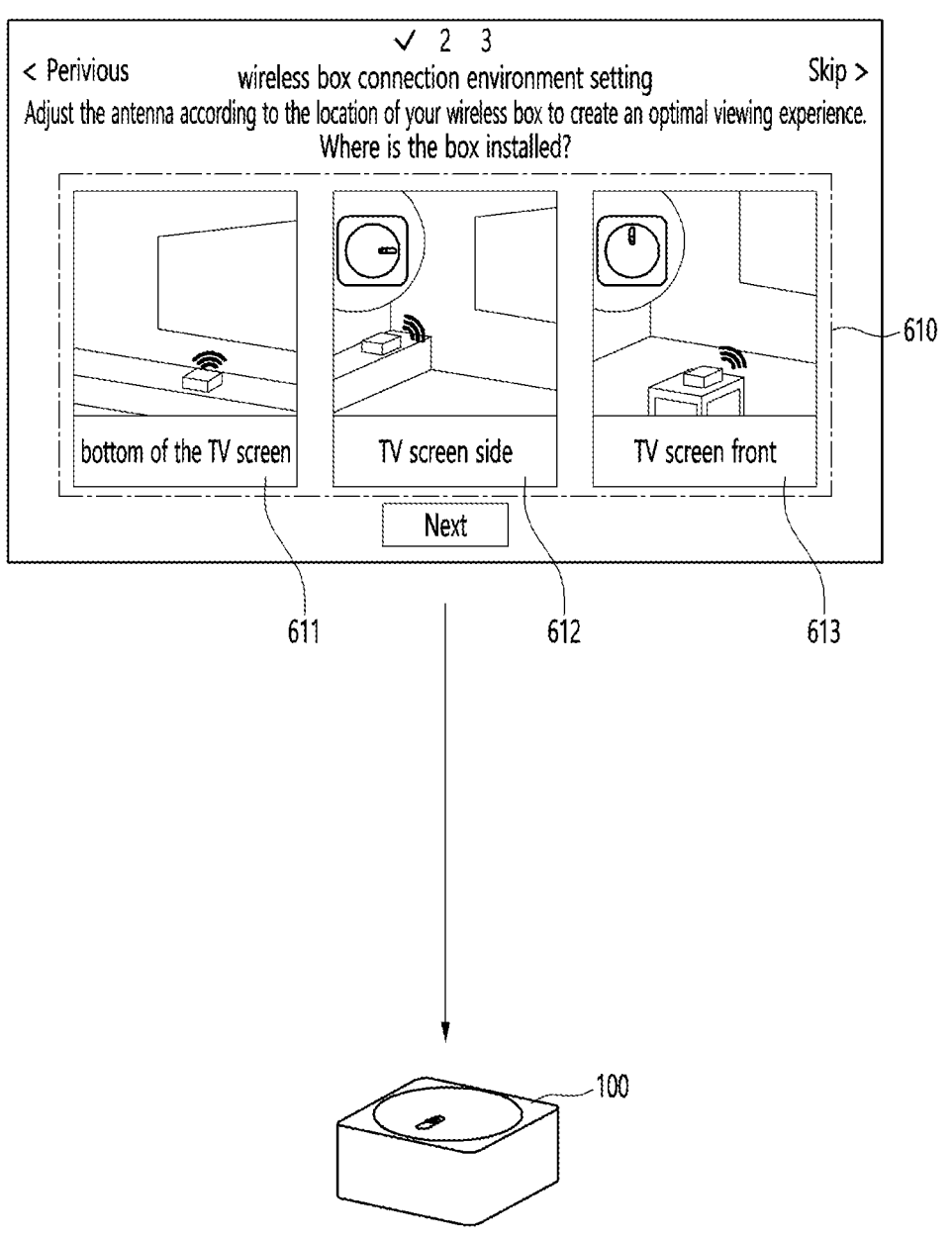
FIG. 6 is a diagram illustrating a setting screen according to an embodiment of the present disclosure.

FIG. 6 is a diagram illustrating a setting screen according to an embodiment of the present disclosure.

Referring to FIG. 6, the display 260 of the A/V receiving device 200 displays a setting screen 600 for selecting an installation direction of the A/V transmitting device 100.

The setting screen 600 may be a screen for setting the installation direction of the A/V transmitting device 100 (box) in a positional relationship with the A/V receiving device 200.

The setting screen 600 may include a direction item list 610 including a first setting item 611 representing the bottom of the display 260, a second setting item 612 representing the side of the display 260, and a third setting item 613 representing the front of the display 260.

FIG. 5 will be described again.

The microcomputer 290 of the A/V receiving device 200 receives a direction selection input indicating the installation direction of the A/V transmitting device 100 (S503), and may transmit information on the installation direction of the A/V transmitting device 100 to the RF transmission interface 160 of the A/V transmitting device 100 through the RF reception interface 240 (S504).

The microcomputer 290 of the A/V receiving device 200 may receive a direction selection input from the remote controller 300.

As shown in FIG. 5, the microcomputer 290 may receive a direction selection input for selecting one of the first to third setting items 511, 512, and 513.

The microcomputer 290 may transmit information on the installation direction of the A/V transmitting device 100 to the RF reception interface 240 of the A/V receiving device 200 through the RF transmission interface 160 according to the direction selection input.

The processor 190 of the A/V transmitting device 100 may generate a guide for adjusting the direction of transmission antennas based on the received installation direction information and a current wireless connection quality state, also referred to as a wireless quality state.

The processor 190 of the A/V transmitting device 100 may obtain a wireless quality state between the A/V transmitting device 100 and the A/V receiving device 200 (S505).

In an embodiment, the wireless quality state may be based on the strength of a signal received from the RF transmission interface 160 by the RF reception interface 240 of the A/V receiving device 200.

The wireless quality state may be one of a plurality of quality states. The plurality of quality states may include a good state, a normal state, a weak state, and a discontinued state.

The wireless quality state may be determined by one or more of a received signal strength indicator (RSSI) and a compression ratio.

The microcomputer 290 or the restoration chip 280 of the A/V receiving device 200 may measure the RSSI of the wireless signal received by the RF reception interface 240 from the RF transmission interface 160.

The microcomputer 290 or the restoration chip 280 of the A/V receiver 200 may transmit the measured RSSI to the RF reception interface 240 through the RF transmission interface 160.

The processor 190 or the compression chip 150 of the A/V transmitting device 100 may obtain a wireless quality state based on the received RSSI.

If the RSSI is within the first strength range, the processor 190 or the compression chip 150 of the A/V transmitting device 100 determines that the wireless quality state is a good state, and if the RSSI is within a second strength range less than the first strength range, the processor 190 or the compression chip 150 of the A/V transmitting device 100 determines that the wireless quality state is a normal state, and if the RSSI is within a third strength range less than the second strength range, the processor 190 or the compression chip 150 of the A/V transmitting device 100 determines that the wireless quality state is a weak state.

If the processor 190 or the compression chip 150 of the A/V transmitting device 100 does not receive the RSSI for a preset time, it may determine the wireless quality state as a disconnected state.

In some embodiments, the processor 190 or the compression chip 150 of the A/V transmitting device 100 may obtain a wireless quality state based on the compression rate of radio data. The compression rate is a ratio between the size of compressed data and the size of original data and may have a real value between 0 and 1.

The processor 190 or the compression chip 150 of the A/V transmitting device 100 determines that the wireless quality state is a good state if the compression rate of the data transmitted through the RF transmission interface 160 is within a first ratio range, determines that the wireless quality state is a normal state, if it is in a second ratio range less than the first ratio range, and determines that the wireless quality state is a weak state, if it is in a third ratio range less than the second ratio range.

The processor 190 of the A/V transmitting device 100 may determine whether the obtained wireless quality state is a preset quality state (S507), and if it is determined that the obtained wireless quality state is the preset quality state, may transmit the wireless quality state information to the RF reception interface 240 of the A/V receiving device 200 through the RF transmitting interface 160 (S509).

In an embodiment, the preset quality state may be the good state.

In another embodiment, the preset quality state may be any one of the good state and the normal state.

The wireless quality state information may include information on the preset quality state.

The microcomputer 290 of the A/V receiving device 200 may output the received wireless quality state information on the display 260 (S511).

The microcomputer 290 may display the wireless quality state information received from the RF transmission interface 160 on the display 260.

The user can recognize that the wireless connection environment of the A/V transmitting device 100 and the A/V receiving device 200 is good based on the good state included in the displayed wireless quality state information.

If the processor 190 of the A/V transmitting device 100 determines that the obtained wireless quality state is not a preset quality state, the A/V transmitting device 100 may generate a direction setting guide for adjusting the direction of one or more transmission antennas of the A/V transmitting device 100 (S513).

The direction setting guide may be a guide for adjusting at least one of a tilting degree or a panning degree of transmission antennas provided in the RF transmission interface 160.

That is, the direction setting guide may be a guide for adjusting at least one of a vertical direction or a left-right direction of transmission antennas provided in the RF transmission interface 160.

The direction setting guide may be generated in the form of audio, image, or video.

The direction setting guide may be a guide for adjusting the direction of the transmission antennas through one or more of the sliding button 401a or the dial 403.

In one embodiment, the processor 190 or the compression chip 150 may generate the direction setting guide if it is determined that the obtained wireless quality state is not the good state.

In another embodiment, the processor 190 or the compression chip 150 may generate a direction setting guide for adjusting the direction of the transmission antennas based on the installation direction of the A/V transmitting device 100, the wireless quality state, and the antenna usage information for the reception antennas.

The antenna usage information may include information indicating in which direction an antenna among a plurality of reception antennas provided in the RF reception interface 240 is being used.

The antenna usage information may include identification information of one or more antennas in use among a plurality of reception antennas included in the RF reception interface 240.

The A/V transmitting device 100 may receive antenna usage information from the A/V receiving device 200.

For example, if the installation direction of the A/V transmitting device 100 is the front direction, the wireless quality state is the normal state, and the right side antenna group 247 of the RF reception interface 240 is used, the processor 190 or compression chip 150 may generate a direction setting guide for rotating the transmission antennas in the left direction.

Meanwhile, the compression chip 150 may generate information for adjusting a direction of a transmission antenna based on the wireless quality state and transmit the generated information to the processor 190. Information for direction control may include one or more of a tilting angle and a panning angle of a transmission antenna.

In this case, the processor 190 may generate a direction setting guide based on the received information.

In another embodiment, in order to overcome the limitation of the storage capacity of the processor 190, the compression chip 150 may directly generate a direction setting guide.

The processor 190 of the A/V transmitting device 100 may transmit the generated guide to the RF reception interface 240 of the A/V receiving device 200 through the RF transmission interface 160 (S515).

The microcomputer 290 of the A/V receiving device 200 may output the received direction setting guide on the display 260 (S517).

Figure 7:
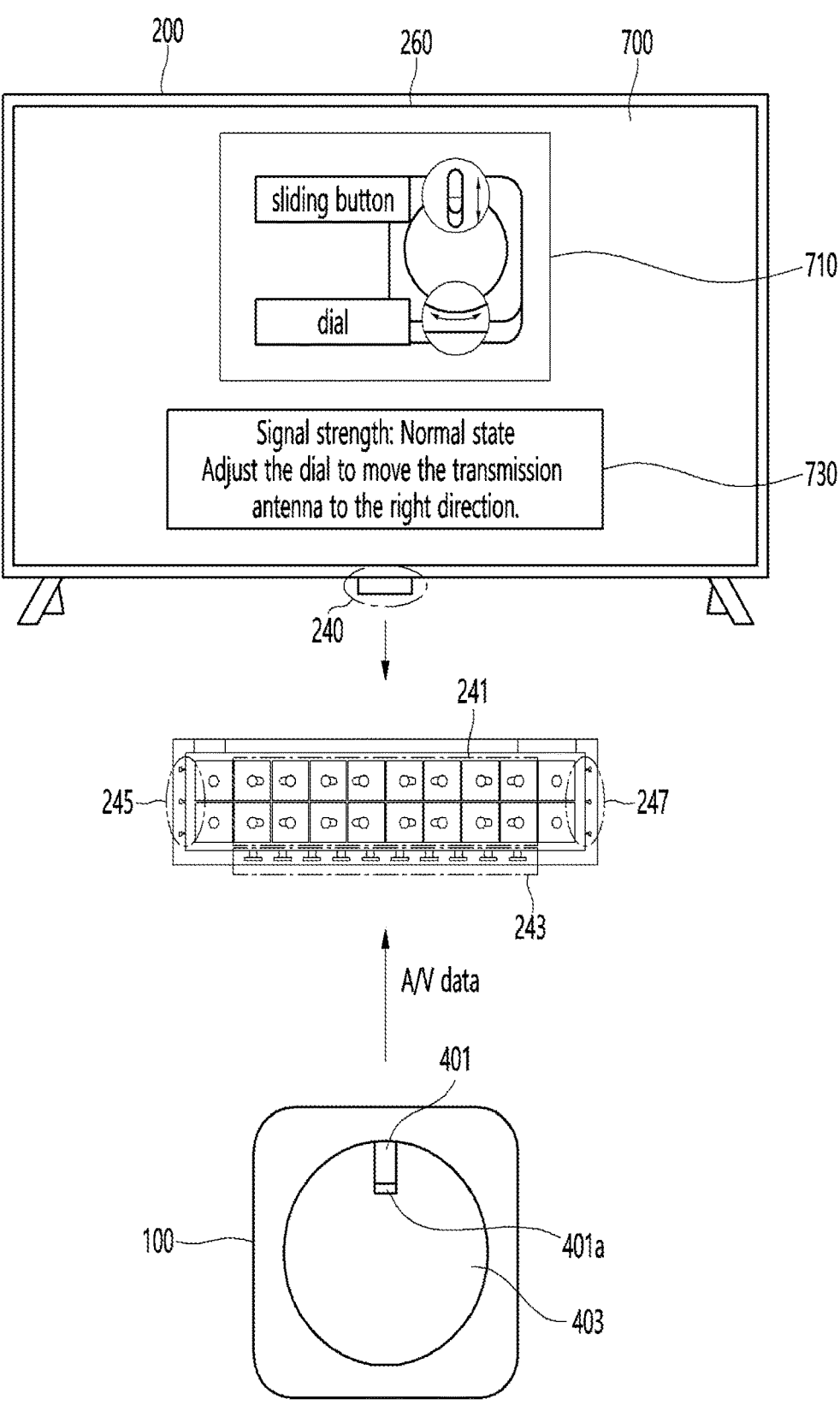
FIG. 7 is a diagram for explaining an example of displaying a direction setting guide based on use information of a reception antenna according to an embodiment of the present disclosure.

FIG. 7 is a diagram for explaining an example of displaying a direction setting guide based on use information of a reception antenna according to an embodiment of the present disclosure.

Referring to FIG. 7, if the installation direction of the A/V transmitting device 100 is the front direction, the wireless quality state is the normal state, and the right side antenna group 247 of the RF reception interface 240 is used, the A/V transmitting device 100 may generate a direction setting guide for moving the transmission antennas to be directed toward the right side antenna group 247.

The A/V transmitting device 100 may transmit the generated direction setting guide to the A/V receiving device 200.

As shown in FIG. 7, the A/V receiving device 200 may display the received direction setting guide 700 on the display 260.

The direction setting guide 700 may include text instructing to operate the dial 403 to move the transmission antennas toward the antenna group being used.

The direction setting guide 700 may further include information about a wireless quality state between the A/V transmitting device 100 and the A/V receiving device 200.

In this way, according to an embodiment of the present disclosure, even a user who is using the wireless display system for the first time can be guided to an optimal wireless environment through adjusting the direction in which the A/V transmitting device 100 is installed.

Meanwhile, according to another embodiment of the present disclosure, a direction setting guide may be provided based on the use information of the transmission antenna and the use information of the reception antenna even if the wireless quality state is a good state.

Figure 8:
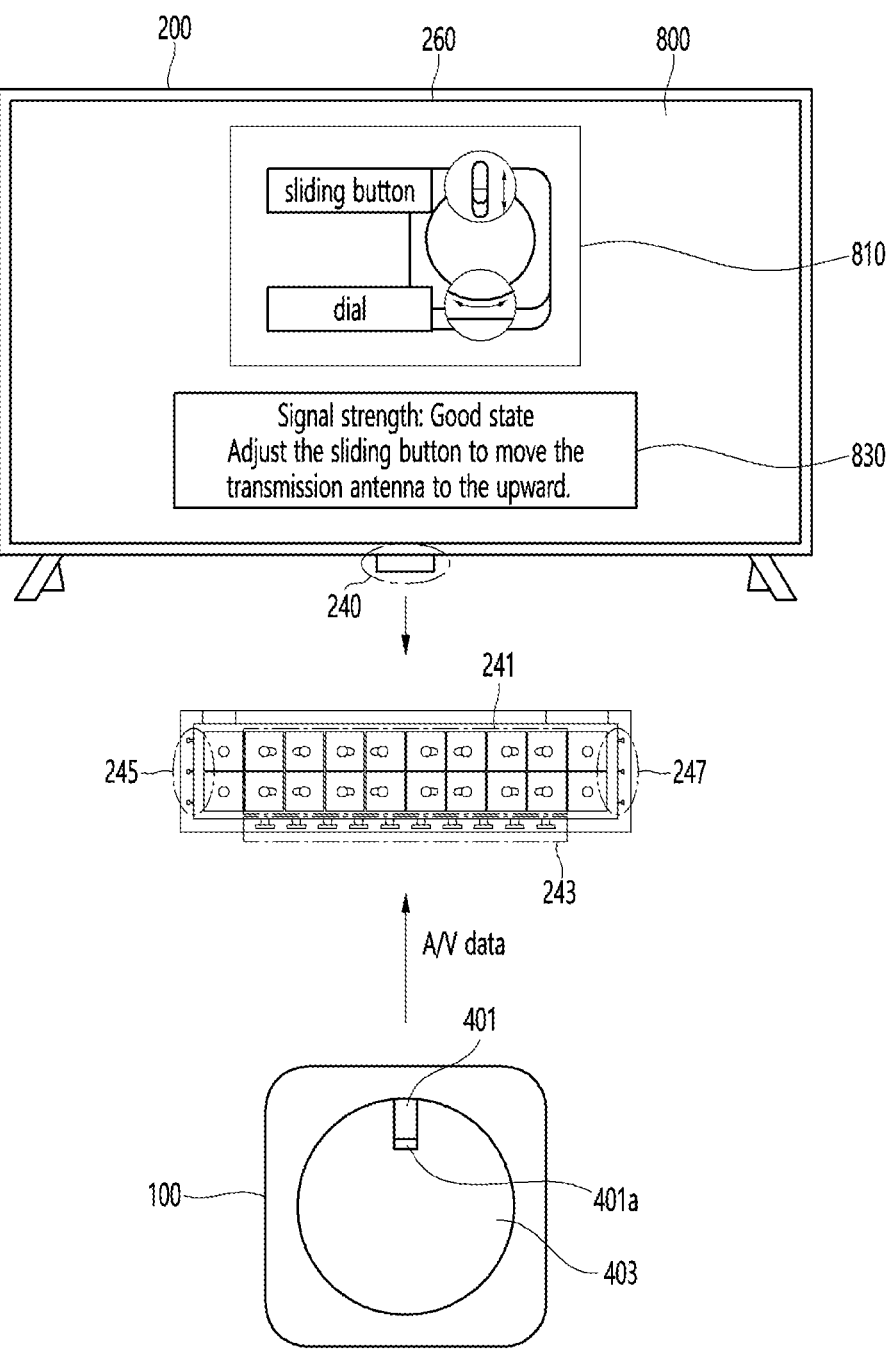
FIG. 8 is a diagram for explaining an example of displaying a direction setting guide based on use information of a transmission antenna according to an embodiment of the present disclosure.

FIG. 8 is a diagram for explaining an example of displaying a direction setting guide based on use information of a transmission antenna according to an embodiment of the present disclosure.

FIG. 8 may be an embodiment corresponding to S513 of FIG. 5.

In FIG. 8, it is assumed that the wireless quality state between the A/V transmitting device 100 and the A/V receiving device 200 is a good state.

The processor 190 of the A/V transmitting device 100 may obtain identification information of one or more transmission antennas used for transmission of A/V data among a plurality of transmission antennas included in the RF transmission interface 160.

A transmission antenna used for transmission of A/V data may be in an on state, and the transmission antenna not used for transmission of A/V data may be in an off state.

The processor 190 of the A/V transmitting device 100 may obtain the number of transmission antennas turned on based on the obtained identification information.

The processor 190 of the A/V transmitting device 100 may determine the direction of transmission antennas in the on state if the number of turned-on transmission antennas is greater than or equal to a preset number.

The processor 190 of the A/V transmitting device 100 may generate a direction setting guide including the determined direction of the transmission antenna, and transmit the generated direction setting guide to the A/V receiving device 200.

Referring to FIG. 8, the A/V receiving device 200 may display the received direction setting guide 800 on the display 260.

The direction setting guide 800 may include text instructing to move the transmission antennas upward by adjusting the sliding button 401a.

The direction setting guide 800 may further include information about the wireless quality state.

As described above, according to an embodiment of the present disclosure, since the wireless quality state is maintained in the good state and the number of transmission antennas used is minimized, an optimal wireless environment can be provided and power consumption can be reduced.

Figure 9:
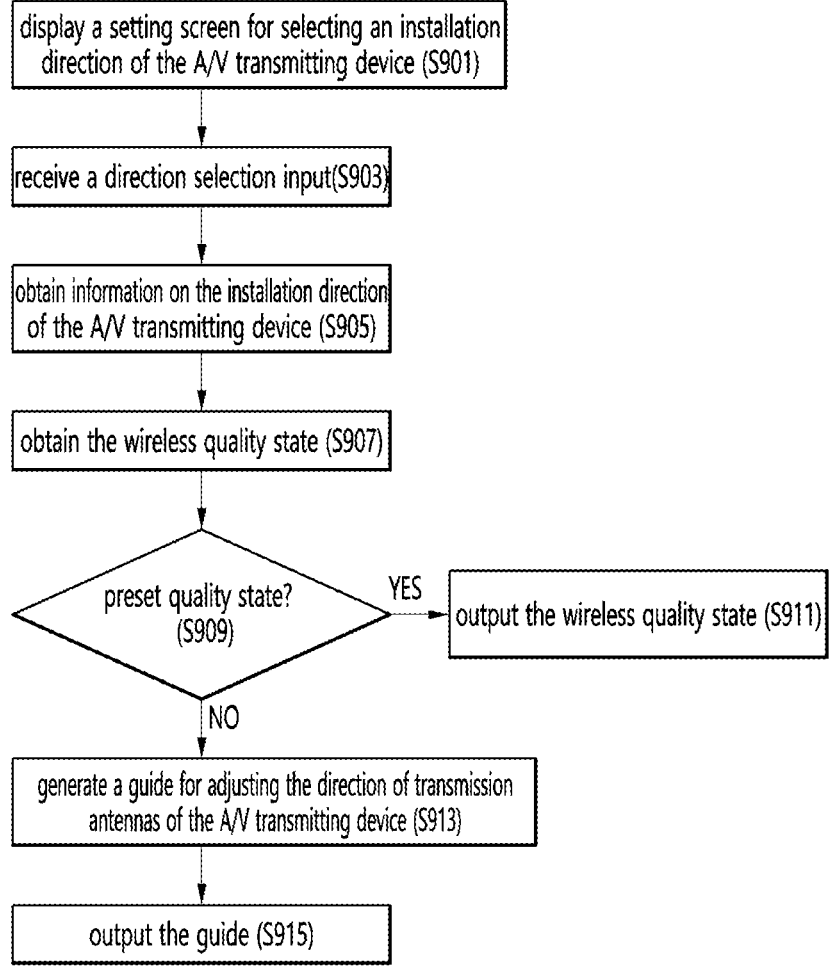
FIG. 9 is a flowchart illustrating an operating method of an A/V receiving device according to an embodiment of the present disclosure.

FIG. 9 is a flowchart illustrating an operating method of an A/V receiving device according to an embodiment of the present disclosure.

Referring to FIG. 9, the microcomputer 290 of the A/V receiving device 200 displays a setting screen for selecting an installation direction of the A/V transmitting device 100 on the display 260 (S901).

The setting screen is as shown in FIG. 6.

The microcomputer 290 of the A/V receiving device 200 receives a direction selection input indicating the installation direction of the A/V transmitting device 100 (S903), and obtain information on the installation direction of the A/V transmitting device 100 according to the direction selection input (S905).

The microcomputer 290 may receive a direction selection input from the remote controller 300.

The microcomputer 290 of the A/V receiving device 200 may obtain the wireless quality state between the A/V transmitting device 100 and the A/V receiving device 200 (S907).

In an embodiment, the wireless quality state may indicate the strength of a signal received from the RF transmission interface 160 by the RF reception interface 240 of the A/V receiving device 200.

The wireless quality state may be one of a plurality of quality states. The plurality of quality states may include a good state, a normal state, a weak state, and a disconnected state.

The wireless quality state may be determined by a received signal strength indicator (RSSI).

The microcomputer 290 or the restoration chip 280 of the A/V receiving device 200 may measure the RSSI of the radio signal received by the RF reception interface 240 from the RF transmission interface 160.

The microcomputer 290 or the restoration chip 280 of the A/V receiver 200 may obtain the wireless quality state based on the measured RSSI.

If the RSSI is within a first strength range, the microcomputer 290 or the restoration chip 280 of the A/V receiving device 200 determines that the wireless quality state is the good state, and if the RSSI is within a second strength range less than the first strength range, the microcomputer 290 or the restoration chip 280 of the A/V receiving device 200 determines that the wireless quality state is a normal state, and if the RSSI is within a third strength range less than the second strength range, the microcomputer 290 or the restoration chip 280 of the A/V receiving device 200 determines that the wireless quality state is a weak state.

If the microcomputer 290 or the restoration chip 280 of the A/V receiving device 200 does not receive RSSI for a preset time, it may determine the wireless quality state as a disconnected state.

The microcomputer 290 of the A/V receiving device 200 may determine whether the obtained wireless quality state is a preset quality state (S909), and if it is determined that the obtained wireless quality state is a preset quality state, the wireless quality state information is output on the display 260 (S911).

If the microcomputer 290 of the A/V receiving device 200 determines that the obtained wireless quality state is not a preset quality state, the microcomputer 290 of the A/V receiving device 200 may generate a direction setting guide for adjusting the direction of one or more transmission antennas of the A/V transmitting device 100 (S913).

The direction setting guide may be a guide for adjusting at least one of a tilting degree or a panning degree of transmission antennas provided in the RF transmission interface 160.

The direction setting guide may be a guide for adjusting the direction of the transmission antennas through one or more of the sliding button 401a or the dial 403.

The microcomputer 290 of the A/V receiving device 200 may output the received direction setting guide on the display 260 (S915).

In this way, according to an embodiment of the present disclosure, even a user who is using the wireless display system for the first time can be guided to an optimal wireless environment through adjusting the direction in which the A/V transmitting device 100 is installed.

Figure 10:
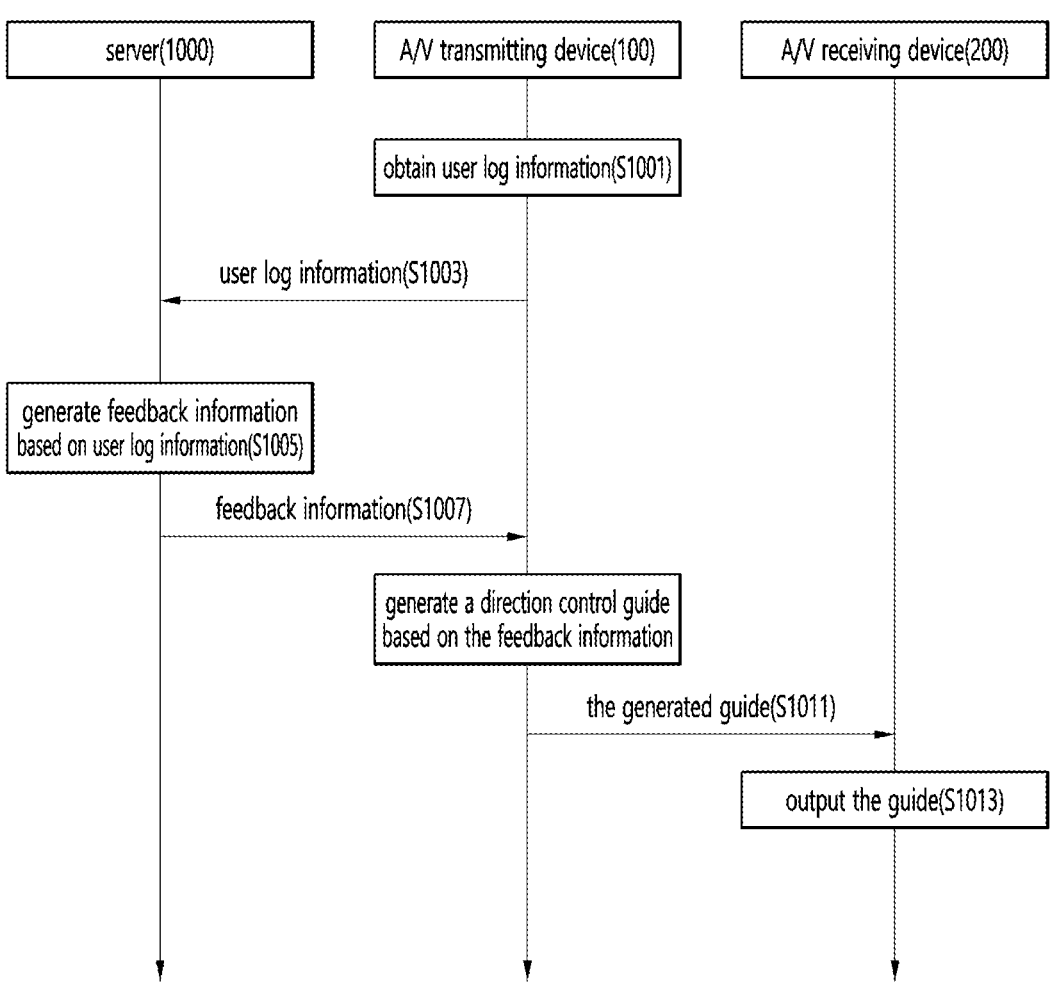
FIG. 10 is a ladder diagram for explaining an operating method of a wireless display system according to another embodiment of the present disclosure.

FIG. 10 is a ladder diagram for explaining an operating method of a wireless display system according to another embodiment of the present disclosure.

FIG. 10 may be a scenario occurring after FIG. 5 or FIG. 9.

The processor 190 of the A/V transmitting device 100 may obtain user log information (S1001).

User log information may include one or more of transmission log information or reception log information.

The transmission log information may include at least one of the installation direction of the A/V transmitting device 100, a beam direction of the transmission antenna, the number of transmission antennas in use (number of antennas in the ON state), the identification information of the transmission antenna used, or wireless quality values (ex, RSSI) measured between the A/V transmitting device 100 and the A/V receiving device 200.

The beam direction of the antenna may include a transmission angle of a signal transmitted by the transmission antenna.

The transmission log information may include at least one of identification information of the A/V transmitting device 100 or user identification information. The identification information of the device may include a model name of the device. User identification information may include an ID capable of identifying a user.

The reception log information may include one or more of the beam direction of the reception antenna of the A/V receiving device 200, the number of used reception antennas (the number of antennas in the ON state), identification information of the used reception antenna, or wireless quality value (ex, RSSI) measured between the A/V transmitting device 100 and A/V receiving devices 200.

The beam direction of the antenna may include a reception angle of a signal received by the reception antenna.

The reception log information may include at least one of identification information of the A/V receiving device 200 and user identification information. The identification information of the device may include a model name of the device. User identification information may include an ID capable of identifying a user.

The processor 190 may generate user log information in the processes of FIGS. 5 and 9 and later, and store the generated user log information in the memory 140.

The processor 190 may store user log information in the memory 140 if initial setting and use of the wireless display system are completed.

The A/V transmitting device 100 and the A/V receiving device 200 may periodically share the transmission log information and the reception log information with each other.

The processor 190 of the A/V transmitting device 100 may transmit the obtained user log information to the server 1000 through the wireless communication interface 120 (S1003).

The processor 190 may transmit user log information to the server 1000 through internet communication.

The server 1000 may generate feedback information based on user log information (S1005) and transmit the generated feedback information to the A/V transmitting device 100 (S1007).

The server 1000 may generate feedback information for improving wireless performance by analyzing user log information.

Based on user log information, the server 1000 may determine whether wireless performance maintains a preset performance or higher.

In an embodiment, the preset performance may be a preset ratio of data compression rate.

In another embodiment, the preset performance may indicate a good state of the wireless quality state.

The server 1000 may generate feedback information indicating that the wireless performance is good if the wireless performance is equal to or greater than the preset performance.

The feedback information may include information for direction adjustment of transmission antennas included in the RF transmit interface 160.

Information for adjusting the direction of transmission antennas may include one or more of tilt angle or panning angle of transmission antennas.

The processor 190 of the A/V transmitting device 100 may generate a direction control guide for adjusting the direction of the transmission antennas of the RF transmission interface 160 based on the received feedback information (S1009).

The processor 190 may generate a direction control guide based on information for direction control of transmission antennas included in the feedback information.

The direction control guide may be an image guiding the control direction of the transmission antennas.

The processor 190 of the A/V transmitting device 100 may transmit the generated direction control guide to the A/V receiving device 200 through the RF transmission interface 160 (S1011).

The microcomputer 290 of the A/V receiving device 200 may output the received direction control guide on the display 260 (S1013).

FIG. 11A is an example of transmission log information if the installation direction of the A/V transmitting device is selected as the front direction, and FIG. 11B is an example of reception log information if the installation direction of the A/V transmitting device is selected as the front direction.

Referring to FIG. 11A, transmission log information 1110 is shown. The transmission log information 1110 may include an item of the number of used transmission antennas (use of two, 1111), a direction of beam transmitted by the used transmission antennas (or transmission angle, 1113), and a compression rate item 1115.

Referring to FIG. 11B, reception log information 1130 is shown. The reception log information 1130 may include an item of the number of used reception antennas (use of two, 1131) and a direction of beams received by the used reception antennas (or reception angle, 1133).

The server 1000 may determine that the transmission antenna and the reception antenna are facing each other through a beam direction included in the transmit log information 1110 and beam a direction included in the reception log information 1130.

In addition, the server 1000 may determine that the wireless performance is equal to or greater than the preset performance if the compression rate measured through the compression rate item 1115 is equal to or greater than a preset ratio (for example, 25).

The server 1000 may generate feedback information indicating that there is no specific matter of wireless performance and transmit the feedback information to either the A/V transmitting device 100 or the A/V receiving device 200 if the transmission antenna and the reception antenna face each other (i.e., the directions of the transmission beam and the reception beam coincide) and the compression rate is greater than or equal to a preset ratio.

FIG. 12A is another example of transmission log information if the A/V transmitting device installation direction is selected as the front direction, and FIG. 12B is another example of reception log information if the A/V transmitting device installation direction is selected as the front direction.

Referring to FIG. 12A, transmission log information 1210 is shown. The transmission log information 1210 may include an item of the number of used transmission antennas (e.g., 16, shown at 1211), a direction of a beam transmitted by the used transmission antennas (or transmission angle, shown at 1213), and a compression ratio item 1215.

Referring to FIG. 12B, reception log information 1230 is shown. The reception log information 1230 may include an item of the number of used reception antennas (e.g., 3, shown at 1231) and a direction of a beam received by the used reception antennas (or reception angle, shown at 1233).

The server 1000 may determine that the transmission beam is facing the front through the direction of the beam included in the transmission log information 1210 and the reception beam is facing the side through the direction of the beam included in the reception log information 1230.

In addition, the server 1000 may determine that the wireless performance is less than the preset performance because the compression rate indicated by the compression rate item 1215 is less than a preset ratio (for example, 25).

That is, the user selects the front direction as the installation direction of the A/V transmitting device 100, but the wireless performance becomes less than the preset performance due to the misalignment of the direction of the transmission antennas.

If the direction of the transmission beam and the direction of the reception beam do not coincide and the compression ratio is less than a preset ratio, the server 1000 may generate feedback information for adjusting the left and right or up and down direction of the transmission antenna. The server 1000 may transmit the generated feedback information to the A/V transmitting device 100 or the A/V receiving device 200.

The A/V receiving device 200 may display a direction control guide based on the feedback information on the display 260.

As described above, according to an embodiment of the present disclosure, an active installation environment may be induced using user log information according to an installation environment, and a guide may be provided in real time by interactively providing information to the user. Accordingly, a user's wireless installation environment can be easily and simply provided.

In addition, even if the user moves the location of the A/V transmitting device 100 or the wireless installation environment changes, the user can easily adjust the antenna because an optimization guide is provided through the network.

Figure 13A:
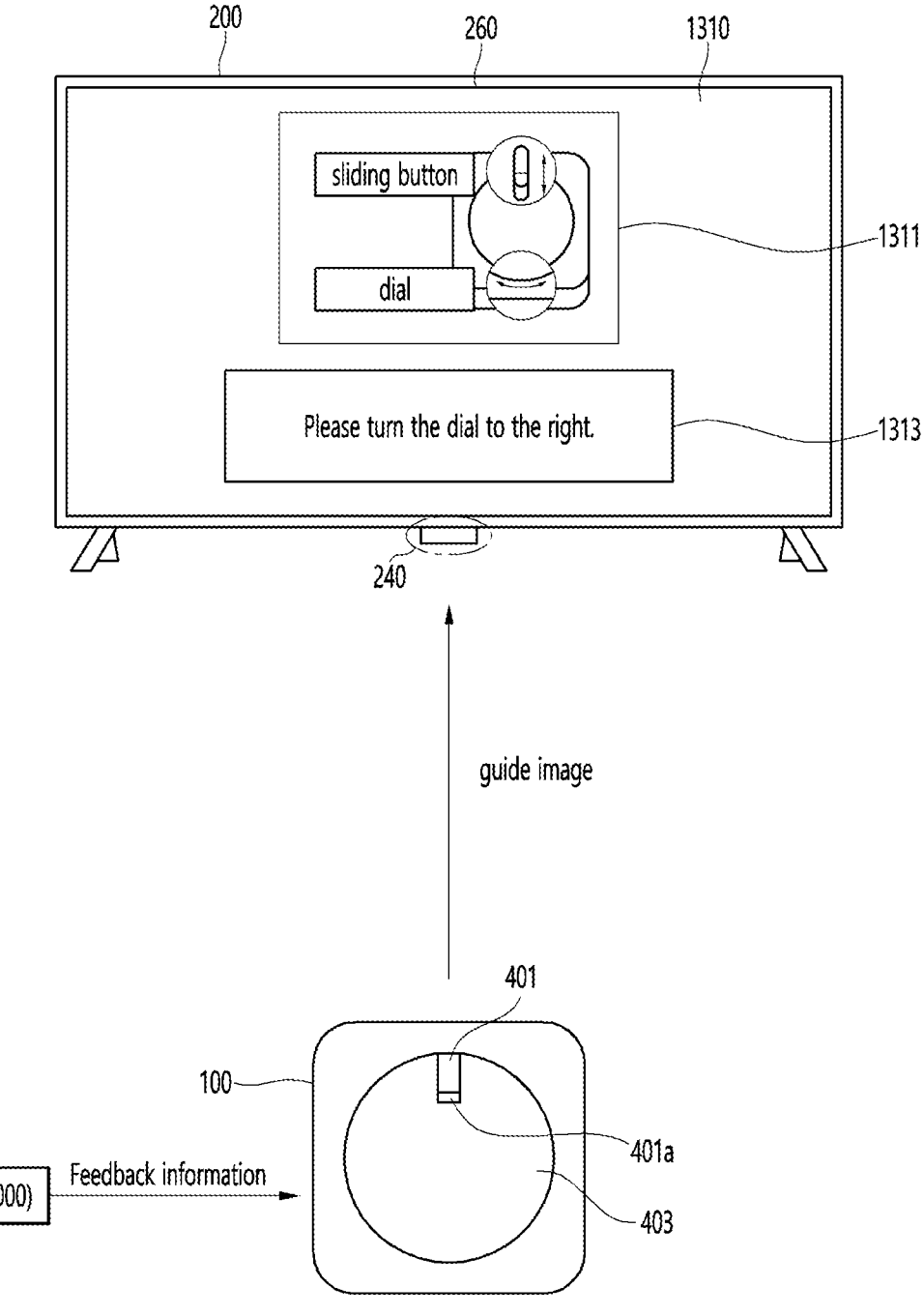
FIG. 13A is a diagram for explaining an example in which a direction control guide is provided through feedback information generated based on user log information.
Figure 13B:
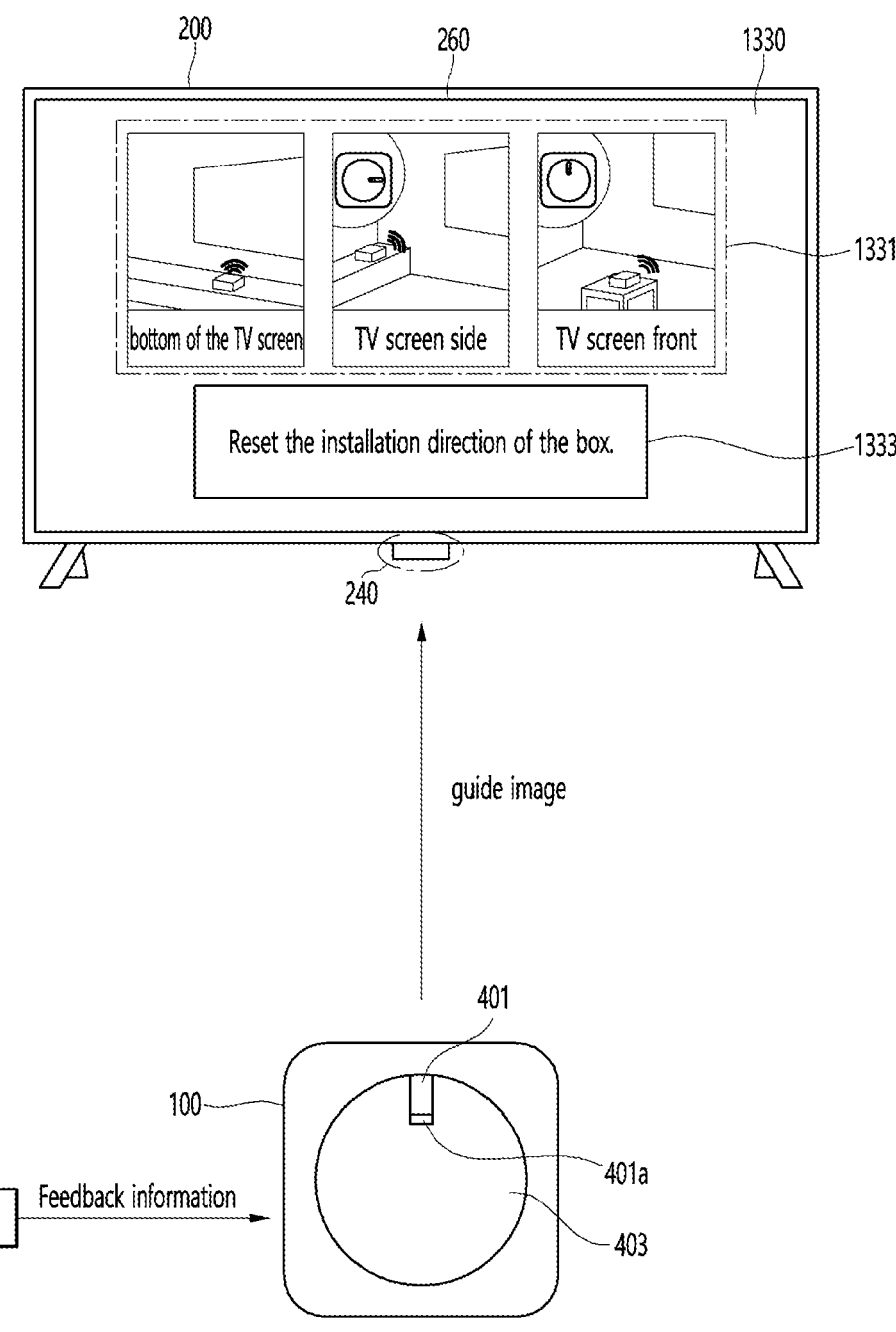
FIG. 13B is a diagram for explaining an example of providing a resetting guide for resetting an installation direction of an A/V transmitting device through feedback information generated based on user log information.

FIG. 13A is a diagram illustrating an example in which a direction control guide is provided through feedback information generated based on user log information, and FIG. 13B is a diagram illustrating installation of an A/V transmitting device through feedback information generated based on user log information. It is a drawing explaining an example of providing a resetting guide to reset the direction.

Referring to FIG. 13A, the server 1000 may generate feedback information based on user log information and transmit the generated feedback information to the A/V transmitting device 100.

The A/V transmitting device 100 may generate a guide image for adjusting the direction of a transmission antenna based on the received feedback information, and may transmit the generated guide image to the A/V receiving device 200.

The A/V receiving device 200 may display the received guide image 1310 on the display 260. The guide image 1310 may include a manipulation image 1311 and a manipulation text 1313 for guiding the manipulation of the sliding button or diamond.

The user can set an optimal wireless environment through the guide image 1310.

Referring to FIG. 13B, the server 1000 may generate feedback information based on user log information and transmit the generated feedback information to the A/V transmitting device 100.

The server 1000 may generate feedback information to reset the installation direction of the A/V transmitting device 100 if it is determined that the initial installation direction of the A/V transmitting device 100 is the front and the measured wireless performance is less than the preset performance based on the user log information.

Even if the wireless quality state is the good state, the server 1000 may determine that the wireless performance is less than a preset performance if the number of transmission antennas used is greater than or equal to a certain number.

The A/V transmitting device 100 may generate a reset guide image for resetting the installation direction of the A/V transmitting device 100 based on the feedback information received from the server 1000, and transmit the generated reset guide image to the A/V receiving device 200.

The A/V receiving device 200 may display the received reset guide image 1330 on the display 260. The reset guide image 1331 may include a reset image 1311 for setting the installation direction of the A/V transmitting device 100 and a reset text 1333.

The user can readjust the installation direction of the A/V transmitting device 100 through the reset guide image 1330 to set an optimal wireless environment.

On the other hand, according to another embodiment of the present disclosure, if based on the user log information, the direction of the transmission beam and the reception beam coincide, and if a frequency of changing the number of transmission antennas being used during a predetermined time period is greater than or equal to a predetermined frequency, the server 1000 may determine that an obstacle may be preventing optimal wireless transmission/reception. The server 1000 may generate feedback information representing the presence of an obstacle, and transmit the generated feedback information to the A/V transmitting device 100 or the A/V receiving device 200.

The A/V receiving device 200 may not display a guide for adjusting the direction of the transmission antenna according to feedback information indicating the existence of an obstacle.

In this way, according to an embodiment of the present disclosure, an obstacle existing between the A/V transmitting device 100 and the A/V receiving device 200 can also be detected, and unnecessary display of the guide can be prevented.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The above-described A/V transmitting device 100 or A/V receiving device 200 is not limited to the configuration and method of the above-described embodiments, and various modifications may be made to the above-described embodiments. All or part of each of the embodiments may be selectively combined to be configured.

What is claimed is:

1. An A/V (Audio/video) transmitting device comprising:
a radio frequency (RF) transmission interface comprising a plurality of transmission antennas and configured to transmit A/V data to an A/V receiving device;
a processor; and
at least one memory including computer program code, where the at least one memory and the computer program code are configured, with the processor, to cause the A/V transmitting device to at least:
receive, from the A/V receiving device, information on an installation direction of the A/V transmitting device obtained by the A/V receiving device via a user input in response to a setting screen displayed at the A/V receiving device for setting the installation direction of the A/V transmitting device;
obtain a wireless quality state between the A/V transmitting device and the A/V receiving device;
generate a guide for adjusting a direction of the plurality of transmission antennas based on the installation direction of the A/V transmitting device and the wireless quality state; and
transmit the guide to the A/V receiving device.

2. The A/V transmitting device of claim 1, wherein the guide is generated based on a determination that the wireless quality state is not a preset quality state, and wherein the guide includes information for adjusting at least an up and down direction or a left and right direction of the plurality of transmission antennas.

3. The A/V transmitting device of claim 1, wherein the guide is generated further based on antenna usage information for a plurality of reception antennas included in the A/V receiving device.

4. The A/V transmitting device of claim 1, further comprising:
a sliding button configured to move the plurality of transmission antennas in an up and down direction; and
a dial configured to rotate the plurality of transmission antennas in a left and right direction.

5. The A/V transmitting device of claim 1, where the at least one memory and the computer program code are configured, with the processor, to further cause the A/V transmitting device to:
transmit user log information to a server;
receive, from the server, feedback information generated based on the user log information;
generate a direction control guide for adjusting the direction of the plurality of transmission antennas based on the received feedback information; and
transmit the direction control guide to the A/V receiving device.

6. The A/V transmitting device of claim 1, wherein the installation direction of the A/V transmitting device is a bottom surface direction, a front direction, or a side direction with respect to a display provided at the A/V receiving device.

7. The A/V transmitting device of claim 3, wherein the guide includes information for rotating the plurality of transmission antennas toward a left direction based on: the installation direction of the A/V transmitting device being a front direction; the wireless quality state not being a preset state; and a right side antenna group being used among the plurality of reception antennas.

8. The A/V transmitting device of claim 3, wherein the antenna usage information is received from the A/V receiving device through the RF transmission interface.

9. The A/V transmitting device of claim 5, wherein:

the user log information includes at least one of transmission log information or reception log information;

the transmission log information includes at least one of the installation direction of the A/V transmitting device, a beam direction of the plurality of transmission antennas, a number of the plurality of transmission antennas in an ON state, identification information of transmission antennas in the ON state, or a wireless quality value; and the reception log information includes at least one of a beam direction of a plurality of reception antennas of the A/V receiving device, a number of the plurality of reception antennas in an ON state, identification information of reception antennas in the ON state, or the wireless quality value.

10. The A/V transmitting device of claim 5, wherein the feedback information includes information for resetting the installation direction of the A/V transmitting device.

11. The A/V transmitting device of claim 9, where the at least one memory and the computer program code are configured, with the processor, to further cause the A/V transmitting device to:

transmit user log information to a server, and receive, from the server, feedback information generated based on the user log information, wherein the feedback information indicates an obstacle between the A/V transmitting device and the A/V receiving device.

12. The A/V transmitting device of claim 10, where the at least one memory and the computer program code are configured, with the processor, to further cause the A/V transmitting device to:

generate a resetting guide for resetting the installation direction of the A/V transmitting device based on the feedback information, and transmit the resetting guide to the A/V receiving device.

13. An A/V (Audio/Video) receiving device comprising:

a display;

a radio frequency (RF) reception interface comprising a plurality of reception antennas and configured to receive A/V data from an A/V transmitting device;

a microcomputer; and at least one memory including computer program code, where the at least one memory and the computer program code are configured, with the microcomputer, to cause the A/V receiving device to at least:

display via the display a setting screen for setting an installation direction of the A/V transmitting device;

receive information on an installation direction of the A/V transmitting device according to a direction selection input received through the setting screen;

transmit the information on the installation direction of the A/V transmitting device received according to the direction selection input;

obtain a wireless quality state between the A/V transmitting device and the A/V receiving device; and display via the display a guide for adjusting a direction of a plurality of transmission antennas of the A/V transmitting device, wherein the guide is generated based on the installation direction of the A/V transmitting device and the wireless quality state.

14. A wireless display system including an audio/video (A/V) transmitting device and an A/V receiving device including a display, wherein the A/V transmitting device is configured to:

receive information on an installation direction of the A/V transmitting device obtained by the A/V receiving device via a user input in response to a setting screen displayed at the A/V receiving device for setting the installation direction of the A/V transmitting device;

obtain a wireless quality state between the A/V transmitting device and the A/V receiving device;

generate a guide for adjusting a direction of a plurality of transmission antennas included in the A/V transmitting device based on the installation direction of the A/V transmitting device and the wireless quality state; and transmit the guide to the A/V receiving device, wherein the A/V receiving device is configured to:

receive and display the guide via the display.

* * * * *